United States Patent
Yan et al.

(10) Patent No.: US 11,683,392 B2
(45) Date of Patent: Jun. 20, 2023

(54) CACHE DECISION METHOD AND APPARATUS

(71) Applicant: HUAWEI TECHNOLOGIES CO., LTD., Shenzhen (CN)

(72) Inventors: Huan Yan, Beijing (CN); Yong Li, Beijing (CN); Haiyang Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 535 days.

(21) Appl. No.: 16/910,576

(22) Filed: Jun. 24, 2020

(65) Prior Publication Data
US 2020/0322447 A1    Oct. 8, 2020

Related U.S. Application Data

(63) Continuation of application No. PCT/CN2018/125797, filed on Dec. 29, 2018.

(30) Foreign Application Priority Data

Dec. 29, 2017   (CN) .......................... 201711498942.7

(51) Int. Cl.
  G06F 15/16       (2006.01)
  H04L 67/5682   (2022.01)
  (Continued)

(52) U.S. Cl.
  CPC ........ H04L 67/5682 (2022.05); H04L 67/289 (2013.01); H04W 24/08 (2013.01)

(58) Field of Classification Search
  CPC ... H04L 67/5682; H04L 67/289; H04W 24/08
  (Continued)

(56) References Cited

U.S. PATENT DOCUMENTS

2012/0076136 A1    3/2012   Jackson
2012/0297088 A1   11/2012   Wang et al.
(Continued)

FOREIGN PATENT DOCUMENTS

| CN | 101001441 A | 7/2007 |
|---|---|---|
| CN | 100461960 C * | 2/2009 |

(Continued)

OTHER PUBLICATIONS

CMCC,"Use cases and requirements for local cache and local breakout in RAN",3GPP TSG RAN WG3 #91BIS R3-160813,Bangalore, India, Apr. 11, 2016,total 6 pages.
(Continued)

Primary Examiner — Hannah S Wang
(74) Attorney, Agent, or Firm — Rimon PC

(57) ABSTRACT

This application provides a cache decision method and apparatus. The method includes: receiving, by a policy control function PCF, first cache information sent by at least one local analytic function LAF. The first cache information includes a base station identifier, identifiers of first N1 pieces of application information that are accessed for a maximum quantity of times, and content corresponding to the identifiers of the N1 pieces of application information, where N1 is a positive integer. The method further includes determining, by the PCF, local cache content based on the first cache information and a capacity of a local cache. In this way, the cache hit rate can be effectively improved, transmission bandwidth and data transmission overheads can be greatly reduced, and users' experience improved.

18 Claims, 13 Drawing Sheets

(51) Int. Cl.
*H04L 67/289* (2022.01)
*H04W 24/08* (2009.01)
(58) Field of Classification Search
USPC .......................................................... 709/201
See application file for complete search history.

(56) References Cited

U.S. PATENT DOCUMENTS

| 2013/0054800 | A1* | 2/2013 | Fernandez Alonso ...................... H04L 47/10 709/224 |
| 2015/0296505 | A1* | 10/2015 | Luna ................. H04M 3/42178 370/329 |
| 2017/0311304 | A1 | 10/2017 | Lu |
| 2018/0006954 | A1* | 1/2018 | Arora ..................... H04L 47/20 |

FOREIGN PATENT DOCUMENTS

| CN | 102026289 | A | * | 4/2011 |
| CN | 103095606 | A | | 5/2013 |
| CN | 103168460 | A | | 6/2013 |
| CN | 105656992 | A | | 6/2016 |
| CN | 106528442 | A | | 3/2017 |
| CN | 106549987 | A | | 3/2017 |
| CN | 106657196 | A | | 5/2017 |
| CN | 106657249 | A | | 5/2017 |
| CN | 106658598 | A | | 5/2017 |
| CN | 107018534 | A | | 8/2017 |
| CN | 103875227 | B | | 11/2017 |
| CN | 107396401 | A | | 11/2017 |
| EP | 2469934 | A1 | | 6/2012 |
| EP | 2887618 | A1 | | 6/2015 |

OTHER PUBLICATIONS

Ejder Bastug et al.,"Big Data Meets Telcos: A Proactive Caching Perspective", Journal of Communications and Networks, vol. X, No. X, Dec. 1, 2015,total 10 pages.

Fidel Cacheda et al.,"Comparison of Collaborative Filtering Algorithms: Limitations of Current Techniques and Proposals for Scalable, High-Performance Recommender Systems",ACM Transactions on the Web, vol. 5, No. 1, Article 2, Publication date: Feb. 1, 2011,total 34 pages.

Xing Yanxia et al, 5G Core Network Key Technologies and Service Support, Telecommunications Technology, 2017, Issue 07, 5 Pages.

* cited by examiner

CACHE DECISION METHOD AND APPARATUS

CROSS-REFERENCE TO RELATED APPLICATIONS

This application is a continuation of International Application No. PCT/CN2018/125797, filed on Dec. 29, 2018, which claims priority to Chinese Patent Application No. 201711498942.7, filed on Dec. 29, 2017. The disclosures of the aforementioned applications are hereby incorporated by reference in their entireties.

TECHNICAL FIELD

This application relates to the field of communications technologies, and in particular, to a cache decision method and apparatus.

BACKGROUND

With continuous growth of mobile devices and diversification of mobile services, 5G network data traffic has increased sharply. The continuous and rapid increase of traffic poses serious challenges to bearer and processing capabilities of mobile networks. When a user uses a mobile device to access content on a network, the user needs to obtain the content from a remote server of a content provider, which may cause a relatively large transmission latency. To relieve network transmission pressure and reduce the transmission latency, a cache deployment method is usually used to cache content that is accessed for a relatively large quantity of times at a location close to the user. The user can obtain the accessed content from a neighboring cache device, thereby improving user experience of accessing online content.

A mobile edge computing (MEC) technology is mainly to deploy a general-purpose server on a radio access side, to provide IT and cloud computing capabilities for a radio access network. FIG. 1 is a schematic diagram of a 5G MEC architecture. As shown in FIG. 1, the 5G MEC architecture mainly includes a control plane and a user plane. An access and mobility management function (AMF) network element and a session management function (SMF) network element are located on the control plane, and other network elements are located on the user plane. A user plane function (UPF) is connected to an access network (AN) by using an interface N3, and N1, N2, N4, N6, and N9 are communications interfaces. An SMF in a 5G core network delivers an offloading rule, and then routes a service flow matching the offloading rule from a UPF close to UE and/or a UPF close to an application to a local data network (DN). The MEC enables the radio access network to support service localization and short-distance deployment, thereby enabling a 5G network to have low latency, reducing bandwidth requirements for a backhaul network, and reducing operation costs.

Content to be cached in the DN is determined by a cache decision, and the cache decision determines cache effects. In the 5G MEC architecture, there is no effective solution to how to make a cache decision to improve a cache hit rate.

SUMMARY

This application provides a cache decision method and apparatus, to improve a cache hit rate and improve user experience in using a network.

According to a first aspect, this application provides a cache decision method. The method includes:

receiving, by a policy control function PCF, first cache information sent by at least one local analytic function LAF, where the first cache information includes a base station identifier, identifiers of first N1 pieces of application information that are accessed for a maximum quantity of times, and content corresponding to the identifiers of the N1 pieces of application information, and N1 is a positive integer; and determining, by the PCF, local cache content based on the first cache information and a capacity of a local cache.

According to the cache decision method provided in the first aspect, the first cache information is information processed by the LAF. Therefore, a cache hit rate can be effectively improved, transmission bandwidth and data transmission overheads are greatly reduced, and network running efficiency is improved, so that user experience in using a network can be improved.

In a possible design, the method further includes:

receiving, by the PCF, second cache information sent by a network data analytics network element NWDAF, where the second cache information is determined by the NWDAF by performing network-wide data analysis based on historical access data sent by the LAF, the second cache information includes a base station identifier, identifiers of first N2 pieces of application information that are accessed for a maximum quantity of times in the entire network, and content corresponding to the identifiers of the N2 pieces of application information, the historical access data is content corresponding to first N3 pieces of application information that are accessed for a maximum quantity of times, and N2 and N3 are positive integers; and the determining, by the PCF, local cache content based on the first cache information and a capacity of a local cache includes:

determining, by the PCF, the local cache content based on the first cache information, the second cache information, and the capacity of the local cache.

According to the cache decision method provided in this implementation, the LAF preprocesses local data and performs local data analysis, and the NWDAF may further perform long-term data analysis by using the preprocessing result, so that there is no need to perform statistical calculation on massive raw data, and the raw data does not need to be sent to the NWDAF. Therefore, on one hand, analysis efficiency is improved, cache decision timeliness is ensured, and combination of a local decision and a network-wide decision can effectively improve a cache hit ratio. On the other hand, transmission bandwidth and data transmission overheads are greatly reduced, so that user experience in using a network can be improved.

In a possible design, the method further includes:

sending, by the PCF, offloading rule information that carries an identifier of application information in the local cache content to a session management function network element SMF serving current user equipment, where the offloading rule information is used to instruct the SMF to send a second notification message to a user plane function UPF, and the second notification message is used to instruct the UPF to send an identifier of target application information to the SMF; or sending, by the PCF, offloading rule information that carries an identifier of application information in the local cache content to an SMF, where the offloading rule information is used to instruct the SMF to forward the offloading rule information to a UPF connected to the SMF.

In a possible design, the method further includes:

sending, by the PCF, a first notification message to the local cache, where the first notification message includes an identifier of application information in the local cache content, and the first notification message is used to instruct the local cache to update the local cache content based on the identifier of application information in the local cache content.

In a possible design, the first cache information is sent by the LAF at a period of t1, or the first cache information is sent by the LAF when a data volume of the first cache information is equal to a first threshold;

the second cache information is sent by the NWDAF at a period of t2, or the second cache information is sent by the NWDAF when a data volume of the second cache information is equal to a second threshold;

the historical access data is sent by the LAF at a period of t3, or the historical access data is sent by the LAF when a data volume of the historical access data is equal to a third threshold; and t1<t2, and t1<t3.

In a possible design, the determining, by the PCF, the local cache content based on the first cache information, the second cache information, and the capacity of the local cache includes:

determining, by the PCF, the local cache content based on percentages of the first cache information and the second cache information in the capacity of the local cache.

In a possible design, the first cache information further includes a quantity of times that the identifiers of the N1 pieces of application information are accessed, and the second cache information further includes a quantity of times that the identifiers of the N2 pieces of application information are accessed.

According to a second aspect, this application provides a cache decision method. The method includes:

receiving, by a session management function network element SMF, an identifier of target application information; and instructing, by the SMF, a UPF to route a data packet that carries the identifier of the target application information to a local cache when an identifier of application information carried in offloading rule information includes the identifier of the target application information.

According to the cache decision method provided in the first aspect, after the SMF receives offloading rule information sent by a PCF, when the identifier of the target application information is received, if it is determined that an identifier of application information carried in the offloading rule information includes the identifier of the target application information, the UPF is instructed to route the data packet that carries the identifier of the target application information to the local cache, so that a data packet requesting a target video is routed to the local cache.

In a possible design, the method further includes:

receiving, by the SMF, the offloading rule information sent by a cache decision function PCF.

In a possible design, the identifier of the target application information is sent by the UPF to the SMF, or the identifier of the target application information is carried in control signaling sent by user equipment to the SMF.

According to a third aspect, this application provides a cache decision apparatus. The apparatus includes:

a receiving module, configured to receive first cache information sent by at least one local analytic function LAF, where the first cache information includes a base station identifier, identifiers of first N1 pieces of application information that are accessed for a maximum quantity of times, and content corresponding to the identifiers of the N1 pieces of application information, and N1 is a positive integer; and a determining module, configured to determine local cache content based on the first cache information and a capacity of a local cache.

In a possible design, the receiving module is further configured to:

receive second cache information sent by a network data analytics network element NWDAF, where the second cache information is determined by the NWDAF by performing network-wide data analysis based on historical access data sent by the LAF, the second cache information includes a base station identifier, identifiers of first N2 pieces of application information that are accessed for a maximum quantity of times in the entire network, and content corresponding to the identifiers of the N2 pieces of application information, the historical access data is content corresponding to first N3 pieces of application information that are accessed for a maximum quantity of times, and N2 and N3 are positive integers; and the determining module is configured to:

determine the local cache content based on the first cache information, the second cache information, and the capacity of the local cache.

In a possible design, the apparatus further includes:

a first sending module, configured to send offloading rule information that carries an identifier of application information in the local cache content to a session management function network element SMF serving current user equipment, where the offloading rule information is used to instruct the SMF to send a second notification message to a user plane function UPF, and the second notification message is used to instruct the UPF to send an identifier of target application information to the SMF; or send offloading rule information that carries an identifier of application information in the local cache content to an SMF, where the offloading rule information is used to instruct the SMF to forward the offloading rule information to a UPF connected to the SMF.

For beneficial effects of the user equipment provided in the third aspect and the possible designs of the third aspect, refer to the beneficial effects brought by the first aspect and the possible implementations of the first aspect. Details are not described herein again.

In a possible design, the apparatus further includes:

a second sending module, configured to send a first notification message to the local cache, where the first notification message includes an identifier of application information in the local cache content, and the first notification message is used to instruct the local cache to update the local cache content based on the identifier of application information in the local cache content.

In a possible design, the first cache information is sent by the LAF at a period of t1, or the first cache information is sent by the LAF when a data volume of the first cache information is equal to a first threshold;

the second cache information is sent by the NWDAF at a period of t2, or the second cache information is sent by the NWDAF when a data volume of the second cache information is equal to a second threshold;

the historical access data is sent by the LAF at a period of t3, or the historical access data is sent by the LAF when a data volume of the historical access data is equal to a third threshold; and t1<t2, and t1<t3.

In a possible design, the determining module is specifically configured to:

determine the local cache content based on percentages of the first cache information and the second cache information in the capacity of the local cache.

In a possible design, the first cache information further includes a quantity of times that the identifiers of the N1 pieces of application information are accessed, and the second cache information further includes a quantity of times that the identifiers of the N2 pieces of application information are accessed.

According to a fourth aspect, this application provides a cache decision apparatus. The apparatus includes:

a receiving module, configured to receive an identifier of target application information; and a processing module, configured to instruct a UPF to route a data packet that carries the identifier of the target application information to a local cache when an identifier of application information carried in offloading rule information includes the identifier of the target application information.

In a possible design, the receiving module is further configured to:

receive the offloading rule information sent by a cache decision function PCF.

In a possible design, the identifier of the target application information is sent by the UPF to the SMF, or the identifier of the target application information is carried in control signaling sent by user equipment to the SMF.

For beneficial effects of the user equipment provided in the fourth aspect and the possible designs of the fourth aspect, refer to the beneficial effects brought by the second aspect and the possible implementations of the second aspect. Details are not described herein again.

According to a fifth aspect, this application provides a cache decision apparatus. The apparatus includes a memory and a processor, where the memory is configured to store a program instruction; and the processor is configured to invoke the program instruction in the memory, to perform the cache decision method according to the first aspect and any possible design of the first aspect.

According to a sixth aspect, this application provides a readable storage medium. The readable storage medium stores an execution instruction. When at least one processor of a cache decision apparatus executes the execution instruction, the cache decision apparatus performs the cache decision method according to the first aspect or any possible design of the first aspect.

According to a seventh aspect, this application provides a program product. The program product includes an execution instruction, and the execution instruction is stored in a readable storage medium. At least one processor of a cache decision apparatus may read the execution instruction from the readable storage medium, and the at least one processor executes the execution instruction, so that the cache decision apparatus is enabled to implement the cache decision method according to the first aspect and any possible design of the first aspect.

According to an eighth aspect, this application provides a chip. The chip is connected to a memory, or a memory is integrated into the chip. When a software program stored in the memory is executed, the cache decision method according to the first aspect and any possible design of the first aspect is implemented.

DESCRIPTION OF EMBODIMENTS

Figure 1:
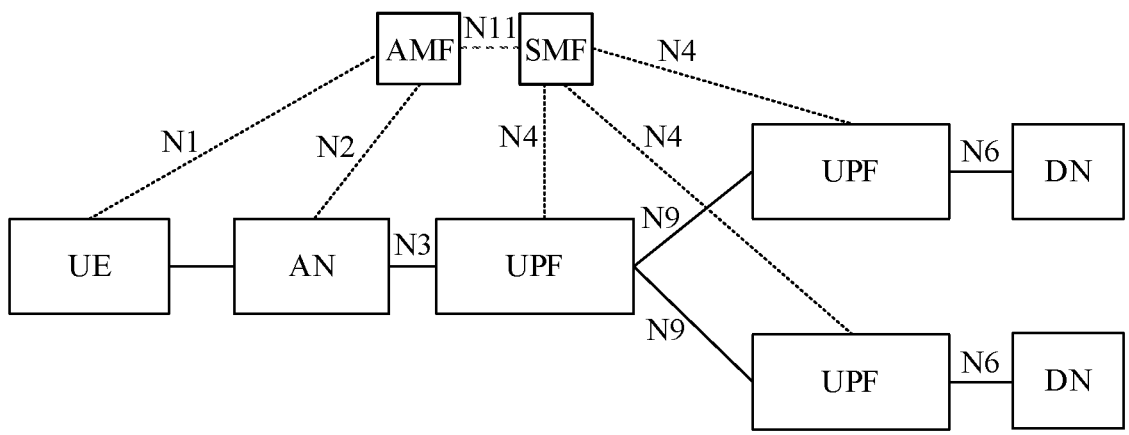
FIG. 1 is a diagram of a 5G MEC architecture.
Figure 2A:
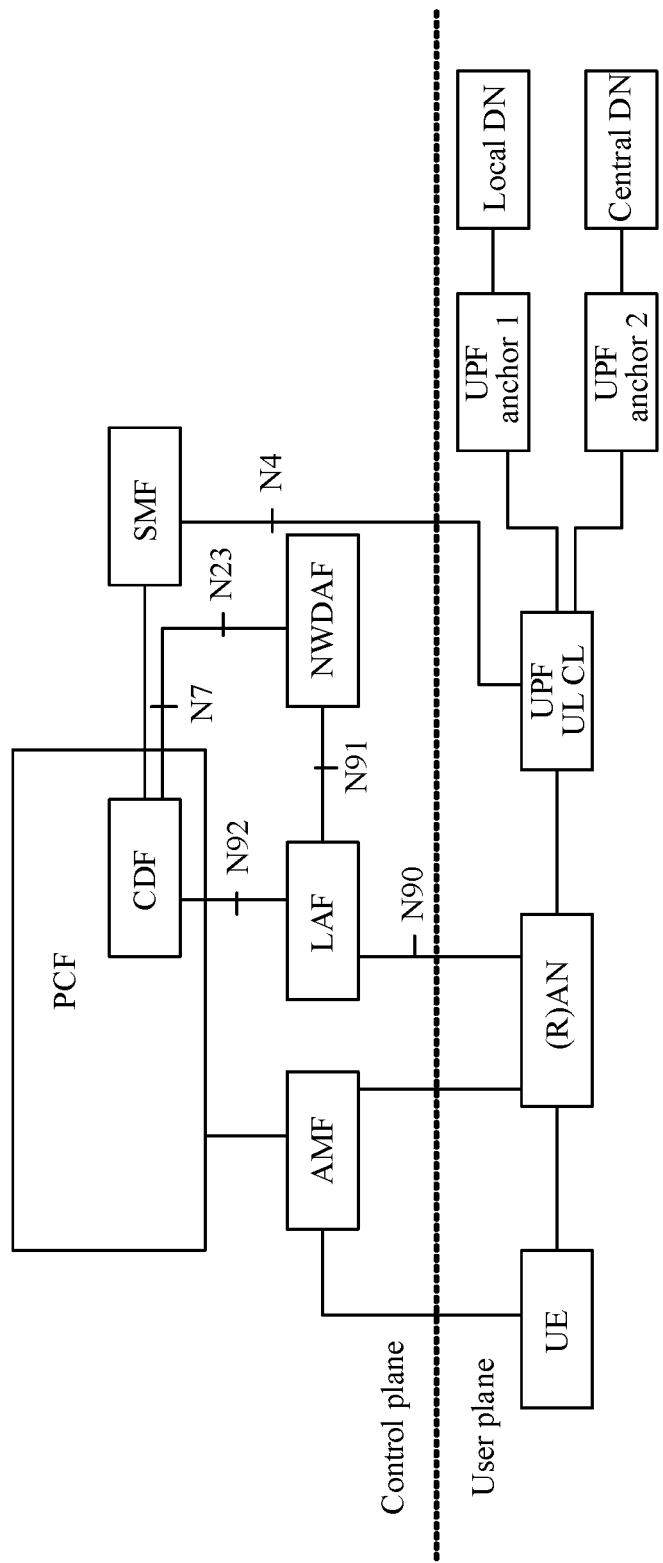
FIG. 2A is a schematic diagram of a network data analytics cache decision architecture based on a 5G MEC reference point form according to this application.
Figure 2B:
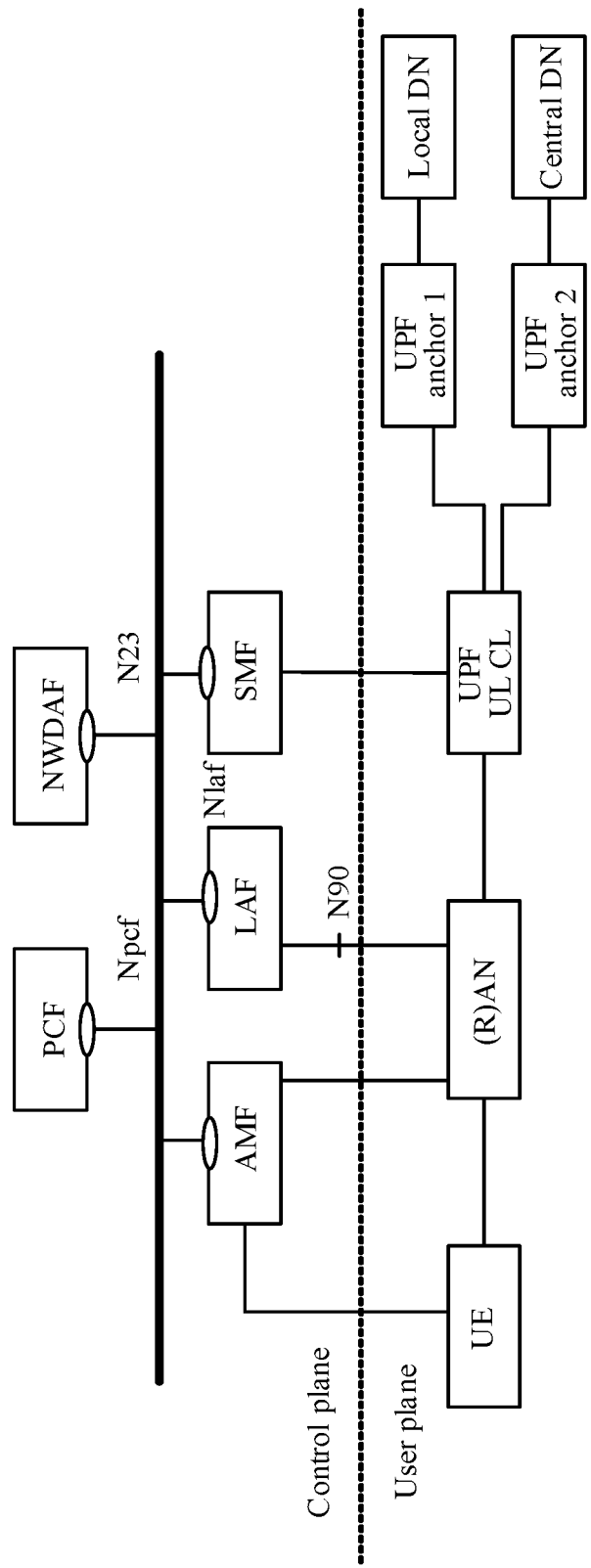
FIG. 2B is a schematic diagram of a network data analysis cache decision architecture based on a 5G MEC service interface form according to this application.

The technical solutions of this application may be applied to a mobile communications system such as a 5G communications system or an LTE system. A communications system architecture to which this application is applied is shown in FIG. 2A and FIG. 2B. FIG. 2A is a schematic diagram of a network data analysis cache decision architecture based on a 5G MEC reference point according to this application, and FIG. 2B is a schematic diagram of a network data analysis cache decision architecture based on a 5G MEC service interface according to this application. In FIG. 2A, user equipment (UE) accesses a radio access network ((Radio) Access Network, (R)AN), control plane network elements include a policy control function (PCF), a cache decision function (DF) module, an SMF, an AMF, a local analytic function (LAF), and a network data analytics network element (NWDAF), and the CDF may be deployed in a PCF network element. User plane network elements include a UPF uplink classifier (UL CL) and a UPF anchor. Compared with a 5G MEC architecture shown in FIG. 1, the LAF, the NWDAF, and the CDF are added, and the CDF is deployed in the PCF network element. In addition, three interfaces are added: an N90 interface between the LAF and a base station, an N91 interface between the LAF and the NWDAF, and an N92 interface between the PCF and the LAF. A network element included in FIG. 2B is the same as that in FIG. 2A, and an Nlaf service interface is newly added to FIG. 2B. The Nlaf service interface includes four services: Nlaf_Subscribe, Nlaf_Notify, and Nlaf_Request/Response. In Nlaf_Subscribe, the CDF subscribes a local analysis decision service of the LAF; in Nlaf_Notify, the LAF notifies the PCF of a local decision result; in Nlaf_Request/Response, an interface of a local statistics analysis result service is provided. In a communications system to which this application is applied, main network elements are the LAF, the NWDAF, the CDF, the SMF, the UL CL, and the UPF anchor. For ease of understanding, the following describes functions of the network elements in this application.

LAF: The LAF analyzes real-time data of a user plane connected to the LAF, for example, obtains data from the base station, or may obtain data from a UPF, make a local decision, and send the data to the CDF. In addition, the LAF reports a data preprocessing result within a preset time to the NWDAF.

NWDAF: The NWDAF learns and predicts access data of a plurality of base stations by using a network data analysis method, to make a global decision.

CDF: The CDF determines local cache content based on the local decision and the global decision, and sends offloading rule information that carries an identifier of application information in the local cache content to the SMF. The CDF may be included in the PCF.

SMF: The SMF receives an identifier of target application information (for example, a URI requested by the user equipment) notified by the UPF. When determining that the offloading rule information includes the identifier of the target application information, the SMF instructs the UPF to route a data packet that carries the identifier of the target application information to a local cache.

UPF: The UPF is responsible for routing the data packet that carries the identifier of the target application information to the local cache.

UL CL: The UL CL forwards the data packet based on the offloading rule information delivered by the SMF.

UPF anchor: The UPF anchor provides different access to a DN.

The UL CL and the UPF anchor are UPFs.

This application provides a cache decision method and apparatus. Based on the 5G MEC architecture, network big data (also referred to as historical user access data) is used to make a decision on a cache, to improve a cache hit rate, reduce network load, and improve user experience in using a network. The following describes the solutions in this application in detail with reference to the accompanying drawings.

Figure 3:
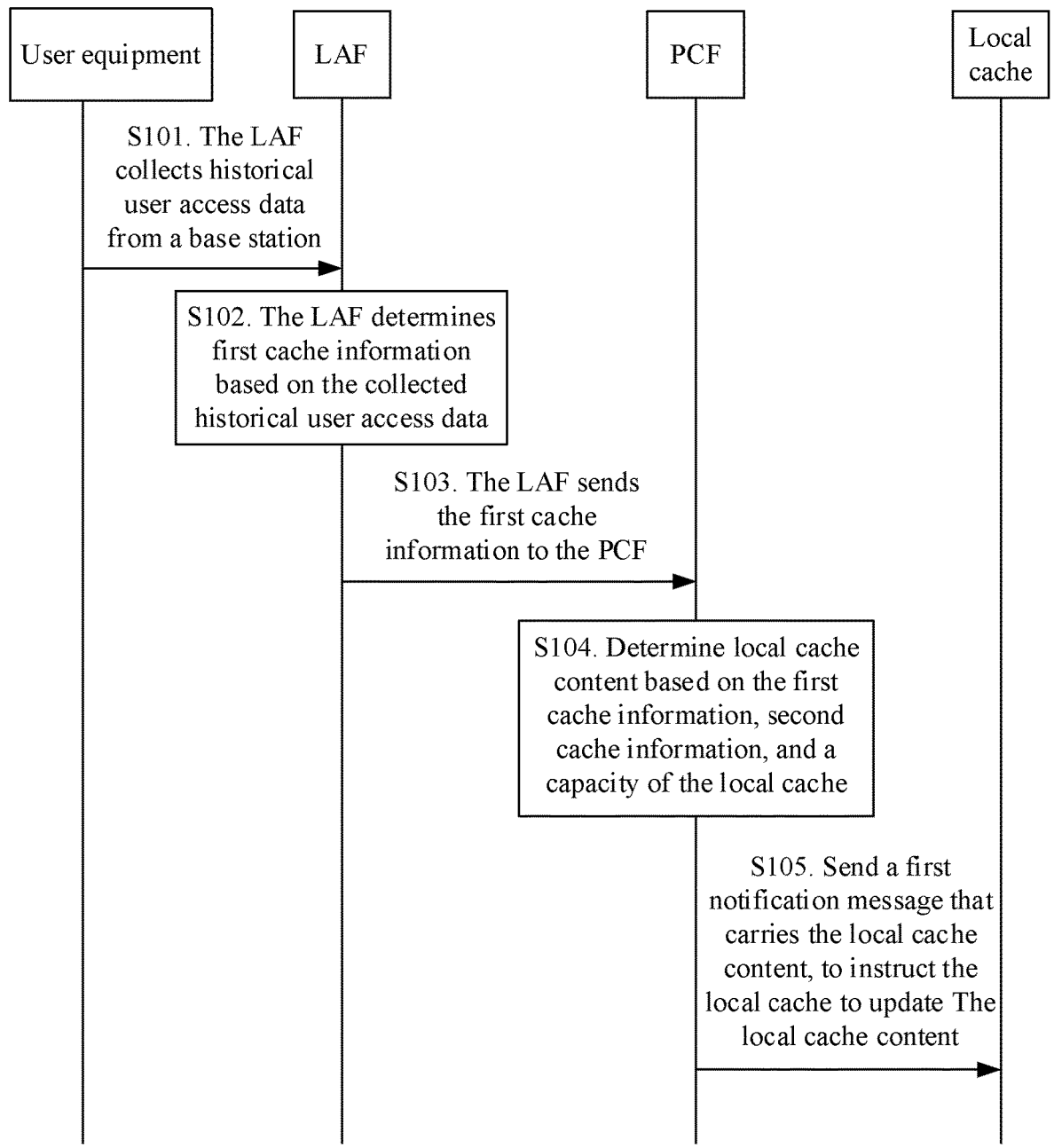
FIG. 3 is a flowchart of an embodiment of a cache decision method according to this application.

FIG. 3 is a flowchart of an embodiment of a cache decision method according to this application. As shown in FIG. 3, the method in this embodiment may include the following steps.

S101. The LAF collects historical user access data from the base station.

Specifically, with reference to FIG. 2A and FIG. 2B, the LAF collects, by using the N90 interface, the historical user access data from a deep packet inspection (DPI) device deployed on the base station. The historical access data includes, for example, a base station identifier, an identifier of application information, a quantity of times that the application information is accessed, and corresponding content, and may further include an access time. The identifier of the application information is, for example, a uniform resource identifier (URI). One LAF is connected to a plurality of base stations, and the LAF collects historical user access data from each base station. The base station identifier is used to distinguish between regional historical user access data, to indicate that the LAF collects data from a base station corresponding to the base station identifier.

S102. The LAF determines first cache information based on the collected historical user access data.

Specifically, the LAF collects statistics on and sorts the collected historical user access data, and selects identifiers of N1 pieces (for example, the first N1 pieces) of application information that are accessed for a maximum quantity of times, corresponding content, and a base station identifier as the first cache information.

S103. The LAF sends the first cache information to the PCF.

Specifically, the first cache information may be periodically sent. For example, the LAF collects the historical user access data from the base station at a period of t1, determines the first cache information based on the historical user access data collected within the time t1, and then sends the first cache information. Alternatively, the LAF may send the first cache information when a data volume of the first cache information is equal to a first threshold.

Specifically, the LAF may send the first cache information to a CDF deployed in the PCF, and the CDF receives the first cache information sent by at least one LAF.

The PCF receives the first cache information sent by the at least one LAF. The first cache information includes a base station identifier, the identifiers of the first N1 pieces of application information that are accessed for a maximum quantity of times, and content corresponding to the identifiers of the N1 pieces of application information, and N1 is a positive integer.

S104. The PCF determines local cache content based on the first cache information and a capacity of a local cache.

Specifically, the local cache content does not exceed the capacity of the local cache, and the PCF may use some or all of the first cache information as the local cache content.

S105. The PCF sends a first notification message to the local cache, where the first notification message includes an identifier of application information in the local cache content, and the first notification message is used to instruct the local cache to update the local cache content based on the identifier of application information in the local cache content.

According to the cache decision method provided in this embodiment, the PCF receives the first cache information sent by the at least one LAF. The first cache information includes the base station identifier, the identifiers of the first N1 pieces of application information that are accessed for a maximum quantity of times, and the content corresponding to the identifiers of the N1 pieces of application information, and the first cache information is information processed by the LAF. Therefore, a cache hit rate can be effectively improved, transmission bandwidth and data transmission overheads are greatly reduced, and network running efficiency is improved, so that user experience in using a network can be improved.

Figure 4:
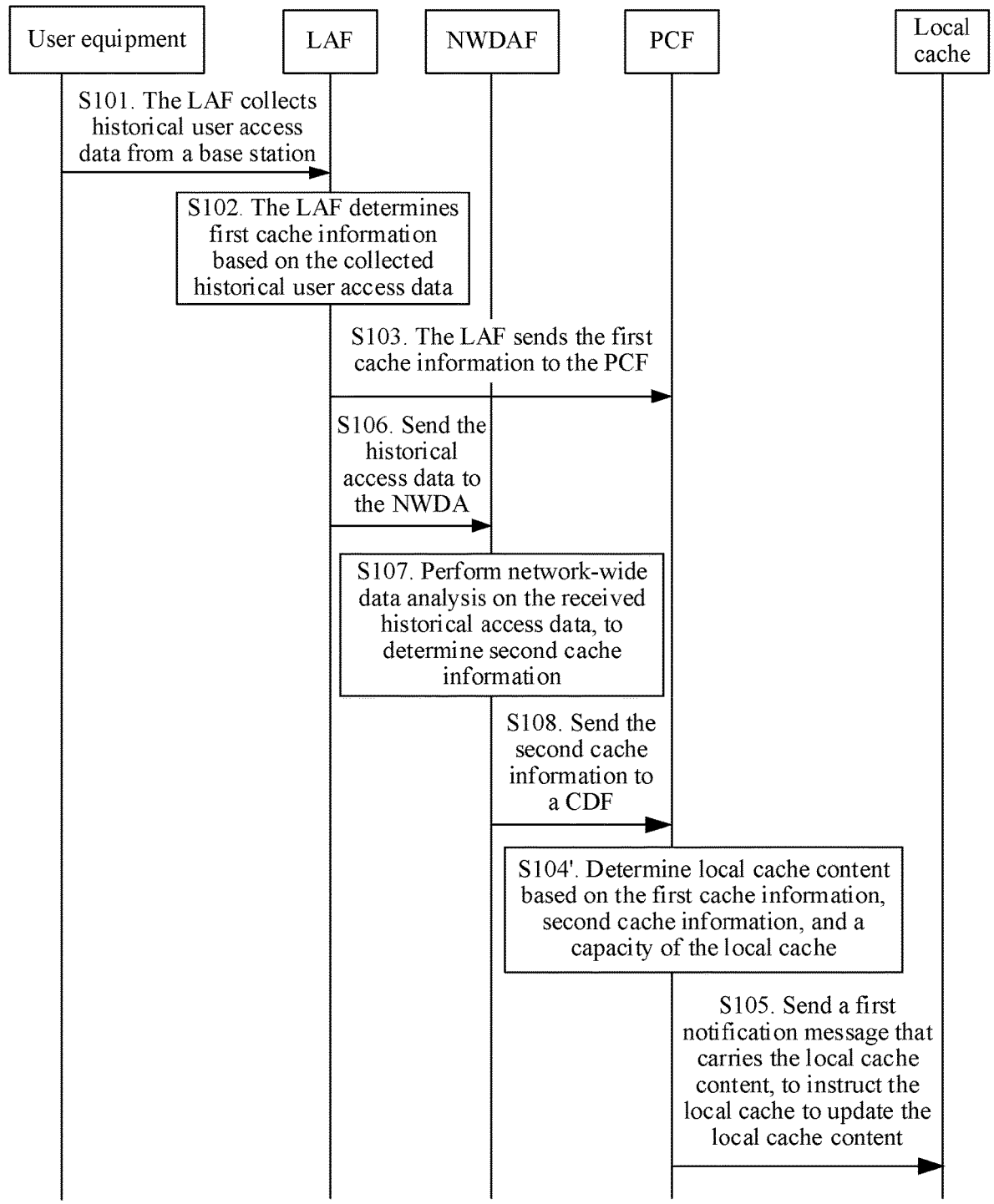
FIG. 4 is a flowchart of an embodiment of a cache decision method according to this application.

FIG. 4 is a flowchart of an embodiment of a cache decision method according to this application. As shown in FIG. 4, based on the embodiment shown in FIG. 3, after S104, the method may further include the following steps.

S106. The LAF sends historical access data to the NWDAF, where the historical access data is content corresponding to N3 pieces (for example, the first N3 pieces) of application information that are accessed for a maximum quantity of times.

Specifically, the historical access data may be periodically sent at a period of t3, or may be sent when a data volume of the historical access data is equal to a third threshold. For example, t3 is used as a period, and t3 is, for example, one day or 24 hours. The LAF sorts collected historical user access data of all base stations according to a quantity of times that application information is accessed, and sends the content corresponding to the first N3 pieces of application information that are accessed for a maximum quantity of times to the NWDAF as the historical access data. Therefore, the LAF collects historical user access data of a base station in which the LAF is located, preprocesses the data, that is, performs the foregoing sorting to obtain the content corresponding to the first N3 pieces of application information that are accessed for a maximum quantity of times, and then sends the preprocessed historical user access data to the NWDAF. Original historical user access data collected from the base station is stored only in the LAF, and does not need to be sent to the NWDAF. Therefore, a volume of data sent to the NWDAF is reduced, and transmission bandwidth and data transmission overheads are greatly reduced.

S107. After receiving the historical access data sent by the LAF, the NWDAF performs network-wide data analysis on the received historical access data, to determine second cache information, the second cache information includes a base station identifier, identifiers of N2 pieces (for example, the first N2 pieces) of application information that are accessed for a maximum quantity of times in the entire network, and content corresponding to the identifiers of the N2 pieces of application information.

S108. The NWDAF sends the second cache information to the PCF.

Specifically, the NWDAF sends the second cache information to the PCF by using an N23 interface. The NWDAF may send the second cache information to the PCF at a period of t2, or may send the second cache information when a data volume of the second cache information is equal to a second threshold.

t1<t2, and t1<t3.

Correspondingly, S104 may be:

S104'. The CDF determines the local cache content based on the first cache information, the second cache information, and the capacity of the local cache.

Specifically, the CDF determines the local cache content based on percentages of the first cache information and the second cache information in the capacity of the local cache, that is, the first cache information and the second cache information occupy a preset percentage, and a sum of the first cache information and the second cache information does not exceed the capacity of the local cache.

According to the cache decision method provided in this embodiment, the LAF collects the historical user access data from the base station, and the LAF makes a local decision to obtain the first cache information and sends the first cache information to the PCF. The LAF preprocesses the historical user access data, and sends the preprocessed historical user access data to the NWDAF. Then, the NWDAF performs network-wide data analysis to obtain the second cache information, and sends the second cache information to the PCF. Finally, the PCF determines the local cache content based on the first cache information, the second cache information, and the capacity of the local cache. Therefore, the LAF preprocesses local data and performs local data analysis, and the NWDAF may further perform long-term data analysis by using the preprocessing result, so that there is no need to collect statistics on and calculate massive original data, and the original data does not need to be sent to the NWDAF. Therefore, on one hand, analysis efficiency is improved, cache decision timeliness is ensured, and combination of a local decision and a network-wide decision can effectively improve a cache hit ratio. On the other hand, transmission bandwidth and data transmission overheads are greatly reduced, so that user experience in using a network can be improved.

Figure 5:
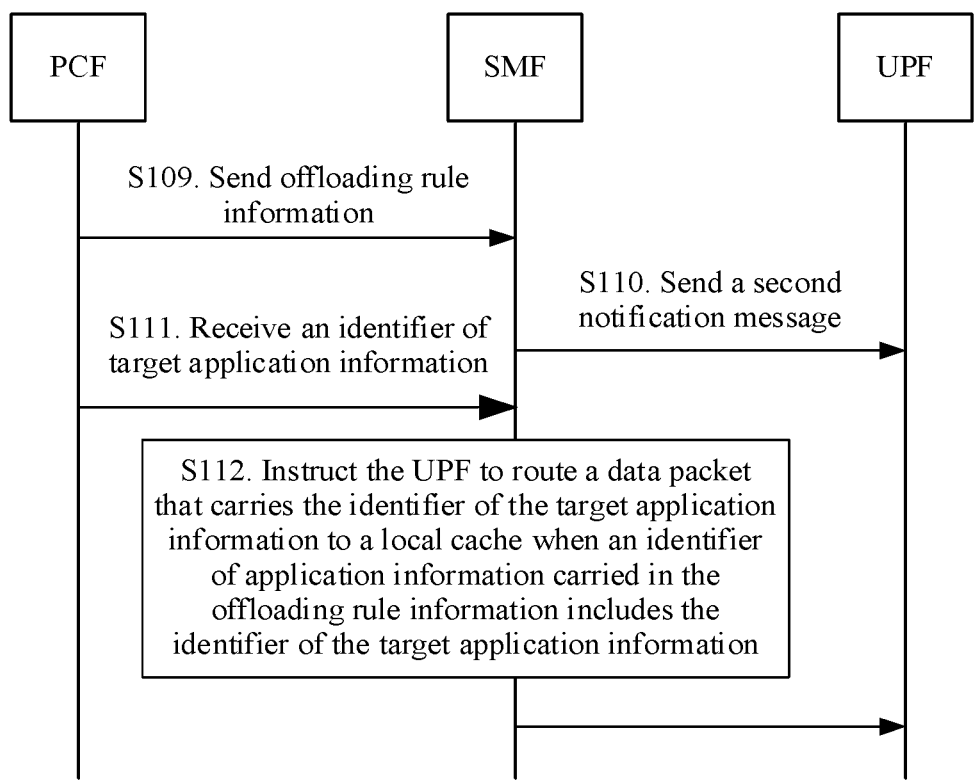
FIG. 5 is a flowchart of an embodiment of a cache decision method according to this application.

After the local cache is updated and a PDU session between the user equipment and the base station is established, FIG. 5 is a flowchart of an embodiment of a cache decision method according to this application, to resolve how the PCF delivers offloading rule information and how to route a data packet that requests a target video to the local cache. As shown in FIG. 5, the method in this embodiment may include the following steps.

S109. The PCF sends offloading rule information that carries an identifier of application information in the local cache content to an SMF serving current user equipment.

S110. After receiving the offloading rule information, the SMF sends a second notification message to the UPF, where the second notification message is used to instruct the UPF to send an identifier of target application information to the SMF.

Alternatively:

S109'. The PCF sends offloading rule information that carries an identifier of application information in the local cache content to an SMF.

Specifically, the PCF sends the offloading rule information to all SMFs in the network.

S110'. After receiving the offloading rule information, the SMF forwards the offloading rule information to a UPF connected to the SMF.

S111. The SMF receives the identifier of the target application information.

Optionally, the identifier of the target application information is sent by the UPF to the SMF. Specifically, the user equipment sends, by using the base station, a data packet used to request a target video to the UPF. The data packet carries the identifier of the target application information, and the UPF notifies the SMF of the identifier of the target application information received by the UPF. Alternatively, the identifier of the target application information is carried in control signaling sent by the user equipment to the SMF.

S112. The SMF instructs the UPF to route the data packet that carries the identifier of the target application information to the local cache when the identifier of application information carried in the offloading rule information includes the identifier of the target application information.

According to the cache decision method provided in this embodiment, after the SMF receives the offloading rule information sent by the PCF, when the identifier of the target application information is received, if it is determined that the identifier of application information carried in the offloading rule information includes the identifier of the target application information, the SMF instructs the UPF to route the data packet that carries the identifier of the target application information to the local cache, so that the data packet requesting the target video is routed to the local cache.

Several specific embodiments are used as follows to describe in detail the technical solutions of the method embodiments shown in FIG. 4 and FIG. 5.

Figure 6:
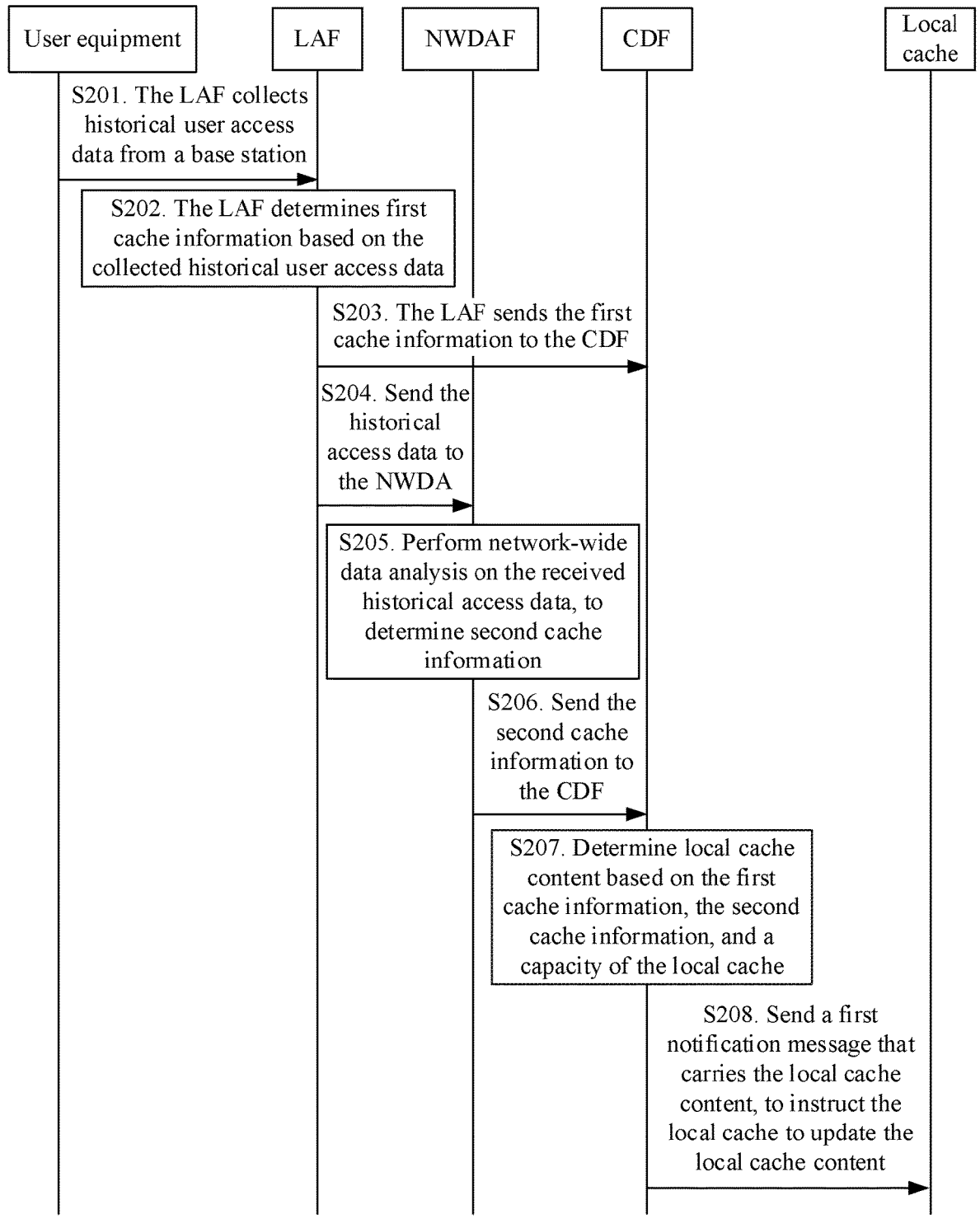
FIG. 6 is a flowchart of an embodiment of a cache decision method according to this application.

FIG. 6 is a flowchart of an embodiment of a cache decision method according to this application. As shown in FIG. 6, the method in this embodiment may include the following steps.

S201. The LAF collects historical user access data from the base station at a period of t1.

Specifically, with reference to FIG. 2A and FIG. 2B, the LAF collects, by using the N90 interface, the historical user access data from a DPI device deployed on the base station. The historical access data includes, for example, a base station identifier, an identifier of application information, a quantity of times that the application information is accessed, and corresponding content, and may further include an access time. t1 is, for example, 1 hour or 2 hours. One LAF is connected to a plurality of base stations, and the LAF collects historical user access data from each base station.

S202. The LAF determines first cache information based on the collected historical user access data within a time t1.

Specifically, the LAF collects statistics on and sorts the historical user access data collected within the time t1, and selects identifiers of first N1 pieces of application information that are accessed for a maximum quantity of times, a quantity of times that the application information is accessed, corresponding content, and a base station identifier as the first cache information.

S203. The LAF sends the first cache information to the CDF.

S204. The LAF sends historical access data to the NWDAF at a period of t3, where the historical access data is content corresponding to first N3 pieces of application information that are accessed for a maximum quantity of times.

Specifically, t3 is, for example, one day or 24 hours. The LAF sorts collected historical user access data of all base stations according to a quantity of times that application information is accessed, and sends the content corresponding to the first N3 pieces of application information that are accessed for a maximum quantity of times to the NWDAF as the historical access data. Therefore, the LAF collects historical user access data of a base station in which the LAF is located, preprocesses the data, that is, performs the foregoing sorting to obtain the content corresponding to the first N3 pieces of application information that are accessed for a maximum quantity of times, and then sends the preprocessed historical user access data to the NWDAF. Original historical user access data collected from the base station is stored only in the LAF, and does not need to be sent to the NWDAF. Therefore, a volume of data sent to the NWDAF is reduced, and transmission bandwidth and data transmission overheads are greatly reduced.

S205. After receiving the historical access data sent by the LAF, the NWDAF performs network-wide data analysis on the received historical access data within a time t2, to determine second cache information, the second cache information includes a base station identifier, identifiers of first N2 pieces of application information that are accessed for a maximum quantity of times in the entire network, a quantity of times that the application information is accessed, and corresponding content.

S206. The NWDAF sends the second cache information to the CDF.

Specifically, the NWDAF sends the second cache information to the CDF by using an N23 interface. For example, if t2 is 24 hours, the NWDAF sends the second cache information to the CDF once.

S207. The CDF determines local cache content based on the first cache information, the second cache information, and a capacity of a local cache.

Specifically, the CDF determines the local cache content based on percentages of the first cache information and the second cache information in the capacity of the local cache, that is, the first cache information and the second cache information occupy a preset percentage, and a sum of the first cache information and the second cache information does not exceed the capacity of the local cache.

S208. The CDF sends a first notification message that carries the local cache content to the local cache, where the first notification message is used to instruct the local cache to update the local cache content.

Specifically, after receiving the first notification message, the local cache updates the local cache content based on the first notification message.

Figure 7:
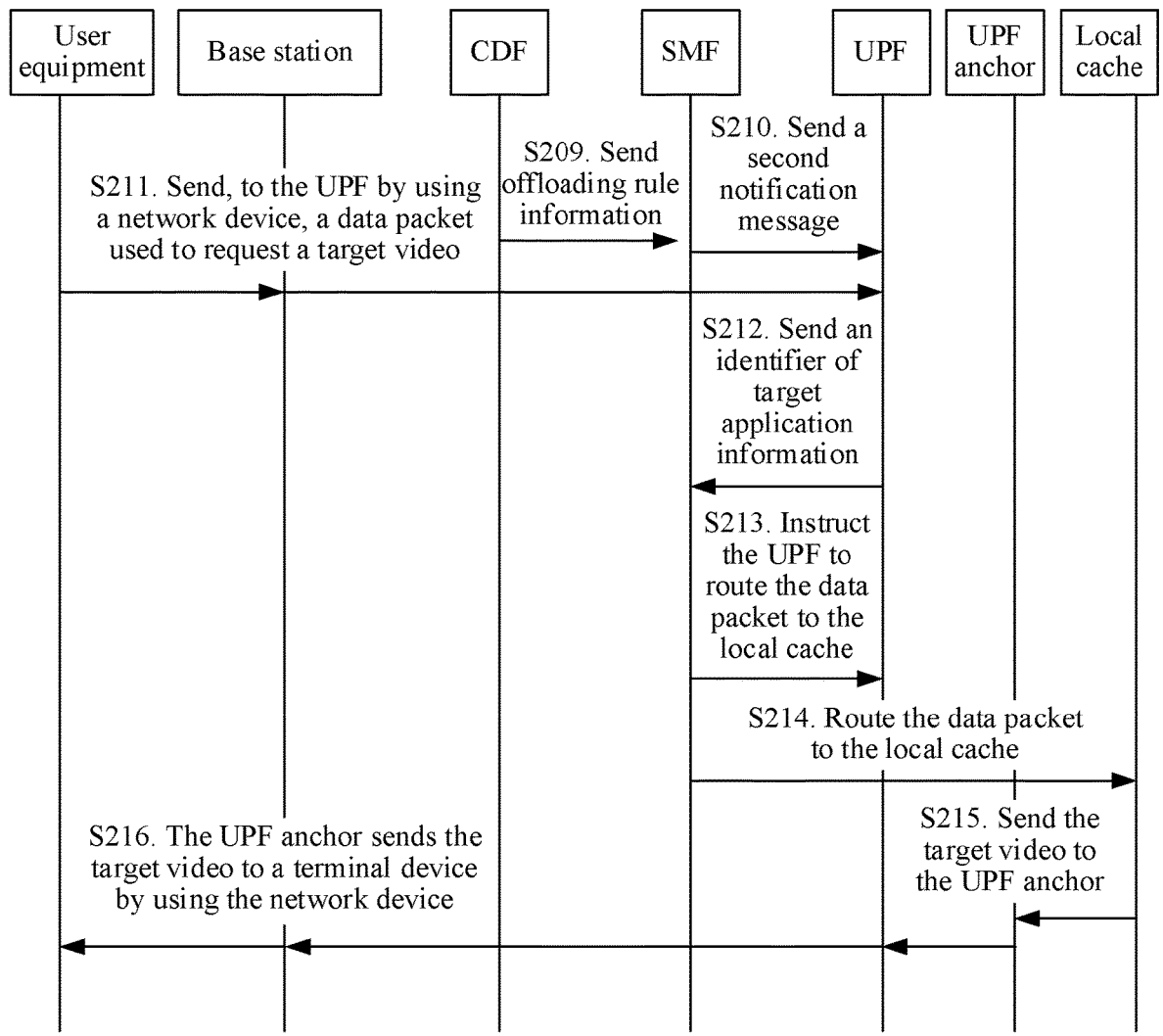
FIG. 7 is a flowchart of an embodiment of a cache decision method according to this application.

After a PDU session between the user equipment and the base station is established, how the CDF delivers offloading rule information and how to route a data packet that requests a target video to the local cache is described in detail below with reference to FIG. 7. FIG. 7 is a flowchart of an embodiment of a cache decision method according to this application. As shown in FIG. 7, the method in this embodiment may include the following steps.

S209. The CDF sends offloading rule information to the SMF, where the offloading rule information carries an identifier of application information in the local cache content.

Specifically, the CDF sends the offloading rule information to an SMF serving current user equipment.

S210. After receiving the offloading rule information, the SMF sends a second notification message to the UPF, where the second notification message is used to instruct the UPF to send an identifier of target application information to the SMF.

S211. The user equipment sends, to the UPF by using the base station, a data packet used to request a target video.

Specifically, the user equipment sends the data packet that carries the identifier of the target application information to the base station, and the base station forwards the data packet to the UPF.

S212. The UPF notifies the SMF of the identifier of the target application information received by the UPF.

S213. When the SMF receives the identifier of the target application information sent by the UPF, and determines that the identifier of application information carried in the offloading rule information includes the identifier of the target application information, the SMF instructs the UPF to route the data packet that carries the identifier of the target application information to the local cache.

S214. The UPF routes the data packet that carries the identifier of the target application information to the local cache.

Specifically, S214 includes:

S2141. The UPF determines whether there is a ULCL and a UPF anchor that are connected to the local cache, and if there is a ULCL and a UPF anchor that are connected to the local cache, performs S2142, or if there is no ULCL and a UPF anchor that are connected to the local cache, performs S2143.

S2142. The UPF routes the data packet to the UPF anchor by using the ULCL.

S2143. The UPF inserts a ULCL, and routes the data packet to a UPF anchor by using the inserted ULCL.

S215. The local cache sends content (the target video) corresponding to the identifier of the target application information to the UPF anchor.

S216. The UPF anchor sends the target video to the user equipment by using the base station.

In this embodiment, the LAF collects the historical user access data from the base station, and the LAF makes a local decision at a period of t1 to obtain the first cache information and sends the first cache information to the CDF. The LAF preprocesses the historical user access data that is within the time t3, and sends the preprocessed historical user access data to the NWDAF. Then, the NWDAF performs network-wide data analysis at a period of t2 to obtain the second cache information, and sends the second cache information to the CDF. Finally, the CDF determines the local cache content based on the first cache information, the second cache information, and the capacity of the local cache. Therefore, the LAF preprocesses local data and performs local data analysis, and the NWDAF may further perform long-term data analysis by using the preprocessing result, so that there is no need to collect statistics on and calculate massive original data, and the original data does not need to be sent to the NWDAF. Therefore, on one hand, analysis efficiency is improved, cache decision timeliness is ensured, and combination of a local decision and a network-wide decision can effectively improve a cache hit ratio. On the other hand, transmission bandwidth and data transmission overheads are greatly reduced, so that user experience in using a network can be improved.

Figure 8:
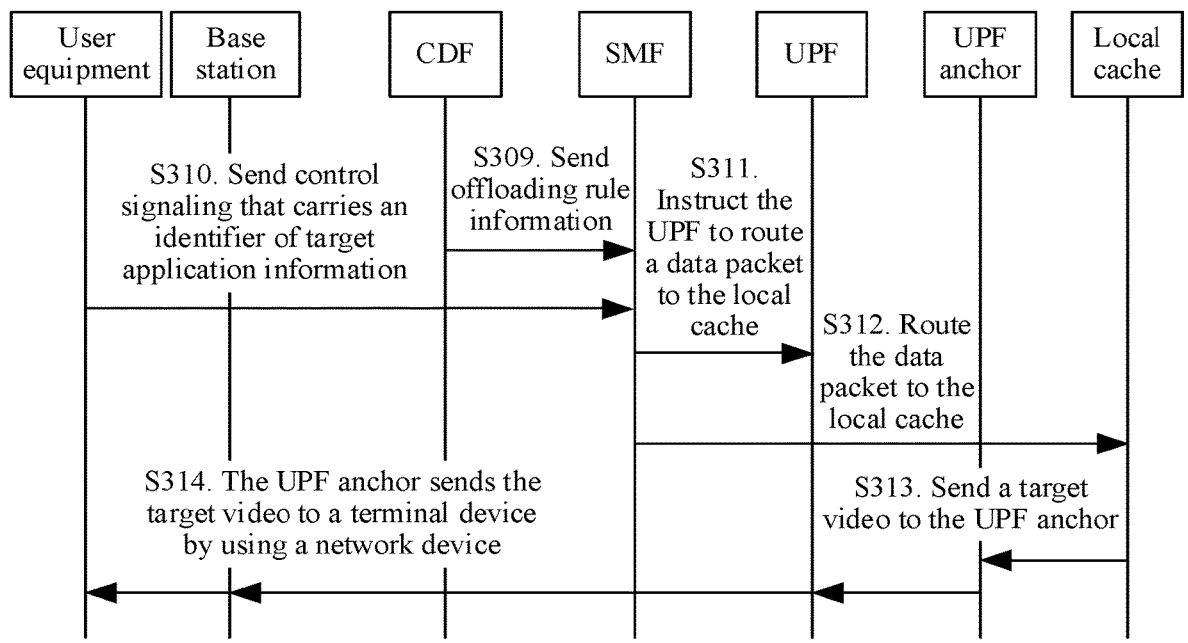
FIG. 8 is a flowchart of an embodiment of a cache decision method according to this application.

FIG. 8 is a flowchart of an embodiment of a cache decision method according to this application. As shown in FIG. 8, a difference between this embodiment and the embodiment shown in FIG. 7 lies in that the identifier of the target application information is carried in control signaling sent by the user equipment to the SMF. The method in this embodiment may include the following steps.

S309. The CDF sends offloading rule information to the SMF, where the offloading rule information carries an identifier of application information in local cache content.

Specifically, the CDF sends the offloading rule information to an SMF connected to the user equipment.

S310. The user equipment sends control signaling that carries an identifier of target application information to the SMF.

Specifically, the control signaling is, for example, a non-access stratum (NAS) message.

S311. When the SMF receives the control signaling, and determines that the identifier of application information carried in the offloading rule information includes the identifier of the target application information, the SMF instructs the UPF to route a data packet that carries the identifier of the target application information to a local cache.

S312. The UPF routes the data packet that carries the identifier of the target application information to the local cache.

Specifically, S312 includes:

S3121. The UPF determines whether there is a ULCL and a UPF anchor that are connected to the local cache, and if there is a ULCL and a UPF anchor that are connected to the local cache, performs S3122, or if there is no ULCL and a UPF anchor that are connected to the local cache, performs S3123.

S3122. The UPF routes the data packet to the UPF anchor by using the ULCL.

S3123. The UPF inserts a ULCL, and routes the data packet to a UPF anchor by using the inserted ULCL.

S313. The local cache sends content (a target video) corresponding to the identifier of the target application information to the UPF anchor.

S314. The UPF anchor sends the target video to the user equipment by using the base station.

In this embodiment, compared with the embodiment shown in FIG. 4, the UPF does not need to report the identifier of the target application information to the SMF, and the user equipment directly sends the control signaling that carries the identifier of the target application information to the SMF, so that application detection of a user plane function can be reduced.

Figure 9A:
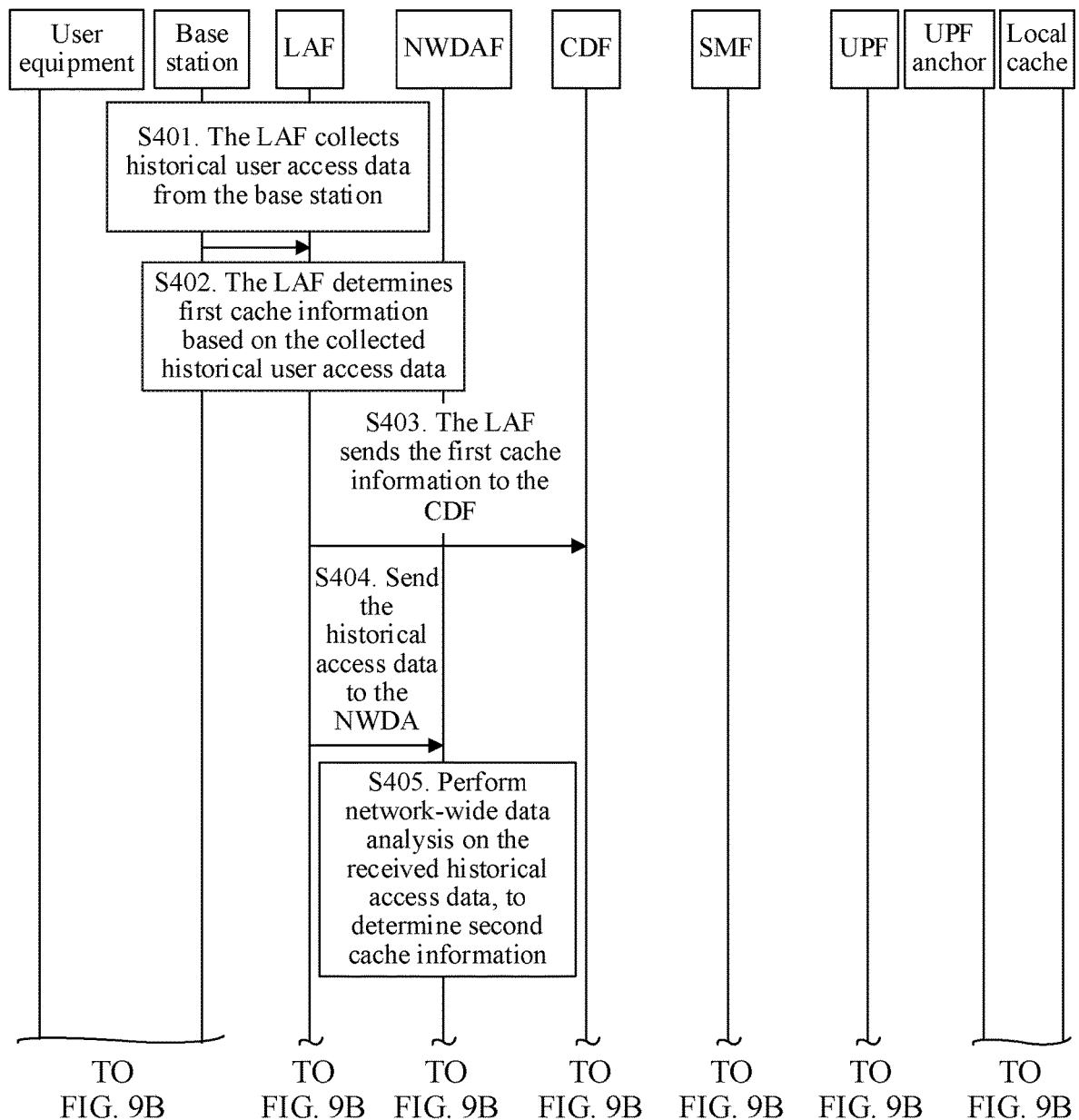
FIG. 9A and FIG. 9B are a flowchart of an embodiment of a cache decision method according to this application.
Figure 9B:
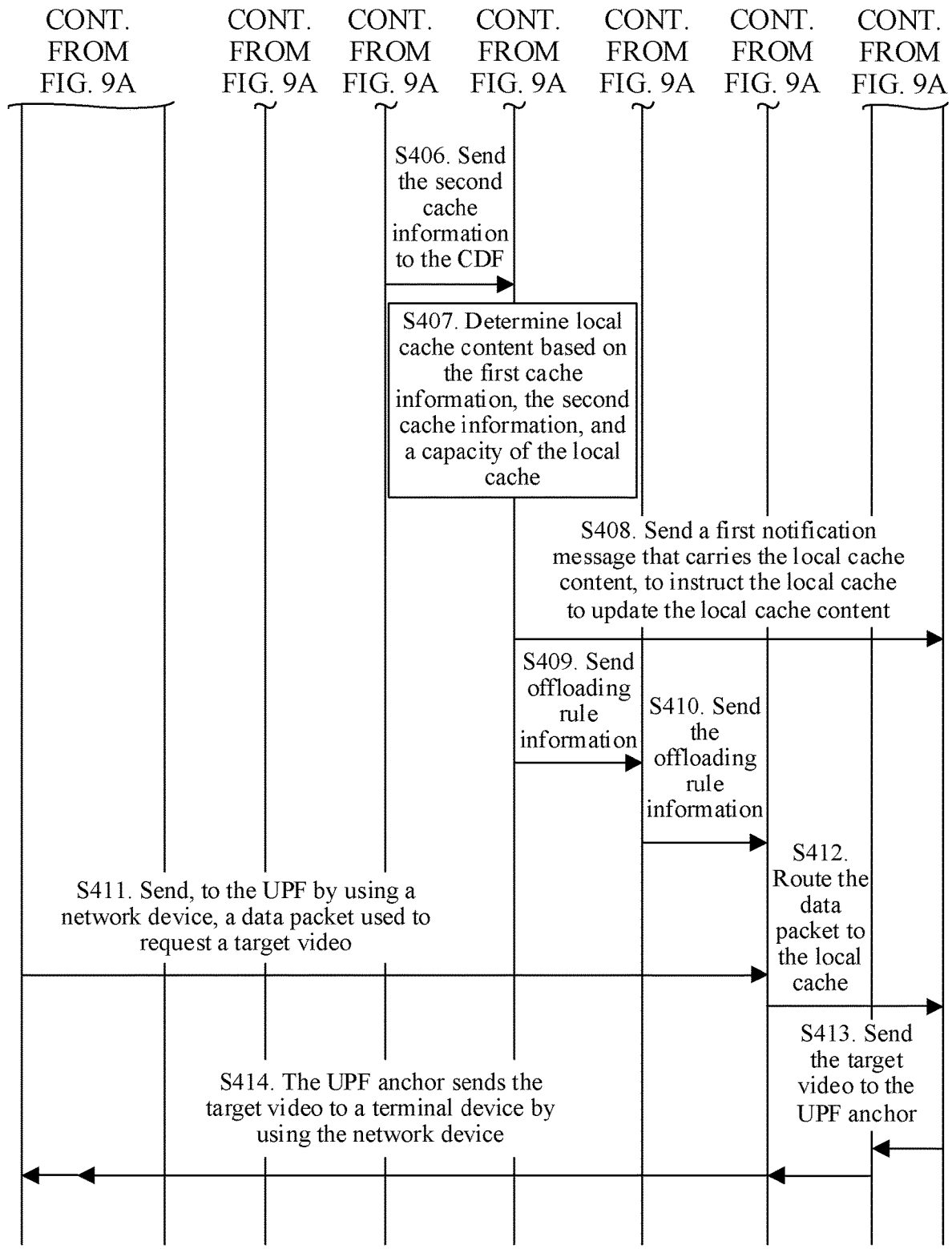

FIG. 9A and FIG. 9B are a flowchart of an embodiment of a cache decision method according to this application. As shown in FIG. 9A and FIG. 9B, the method in this embodiment may include the following steps.

S401 to S408 are the same as S201 to S208, and details are not described herein again.

S409. The CDF sends offloading rule information to all SMFs in the network, where the offloading rule information carries an identifier of application information in local cache content.

S410. The SMF sends the offloading rule information that carries the identifier of the application information in the local cache content to the UPF.

Specifically, the SMF sends the offloading rule information to all UPFs managed by the SMF (that is, all UPFs connected to the SMF).

S411. The user equipment sends, to the UPF by using the base station, a data packet used to request a target video, where the data packet carries an identifier of target application information.

Specifically, the user equipment sends the data packet that carries the identifier of the target application information to the base station, and the base station forwards the data packet to the UPF.

S412. When the UPF receives the data packet that is sent by the user equipment and that carries the identifier of the target application information, and determines that the identifier of application information carried in the offloading rule information includes the identifier of the target application information, the UPF routes the data packet to a local cache.

Specifically, S412 includes:

S4121. The UPF determines whether there is a ULCL and a UPF anchor that are connected to the local cache, and if there is a ULCL and a UPF anchor that are connected to the local cache, performs S4122, or if there is no ULCL and a UPF anchor that are connected to the local cache, performs S4123.

S4122. The UPF routes the data packet to the UPF anchor by using the ULCL.

S4123. The UPF inserts a ULCL, and routes the data packet to a UPF anchor by using the inserted ULCL.

S413. The local cache sends content (the target video) corresponding to the identifier of the target application information to the UPF anchor.

S414. The UPF anchor sends the target video to the user equipment by using the base station.

In this embodiment, compared with the embodiment shown in FIG. 7, the offloading rule information is delivered to the UPF in advance by using the SMF. After receiving the data packet that is sent by the user equipment and that requests the target video, the UPF directly determines, based on the offloading rule information, whether to route the data packet to a local network cache. Therefore, information exchange between a control plane function and a user plane function is reduced.

It should be noted that in the embodiments shown in FIG. 7 to FIG. 9, the LAF periodically reports, to the CDF and the NWDAF, the historical user access data collected from the base station, and the NWDAF also periodically reports the second cache information to the CDF. Optionally, alternatively, reporting may be performed when a data volume reaches a preset threshold. For example, the LAF collects historical user access data from the base station, and when a data volume reaches a first preset threshold, the LAF uses identifiers of first N1 pieces of application information that are accessed for a maximum quantity of times in the collected historical user access data, a quantity of times that the application information is accessed, corresponding content, and a base station identifier as first cache information, and sends the first cache information to the CDF. The LAF collects historical user access data from the base station, and when a data volume reaches a third preset threshold, the LAF sends, to the NWDAF, content corresponding to first N3 pieces of application information that are accessed for a maximum quantity of times in the collected historical user access data. After the NWDAF receives the historical access data sent by the LAF, if a data volume received by the NWDAF reaches a second threshold, the NWDAF performs network-wide data analysis on historical access data that reaches the second threshold, to determine second cache information and send the second cache information to the CDF. Other steps are the same, and details are not described herein again.

Figure 10:
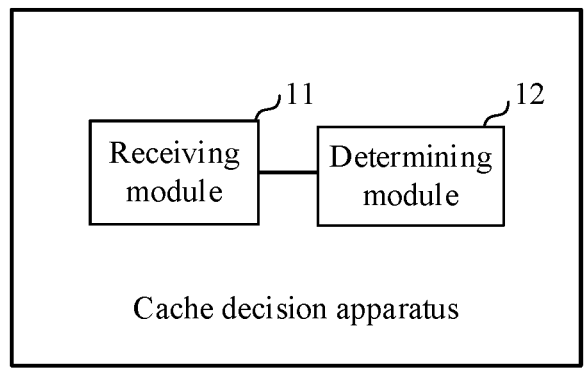
FIG. 10 is a schematic structural diagram of an embodiment of a cache decision apparatus according to this application.

FIG. 10 is a schematic structural diagram of an embodiment of a cache decision apparatus according to this application. As shown in FIG. 10, the apparatus in this embodiment may include a receiving module 11 and a determining module 12. The receiving module 11 is configured to receive first cache information sent by at least one analytic function LAF. The first cache information includes a base station identifier, identifiers of first N1 pieces of application information that are accessed for a maximum quantity of times, and content corresponding to the identifiers of the N1 pieces of application information, and N1 is a positive integer. The determining module 12 is configured to determine local cache content based on the first cache information and a capacity of a local cache.

Optionally, the receiving module 11 is further configured to receive second cache information sent by a network data analytics network element NWDAF. The second cache information is determined by the NWDAF by performing network-wide data analysis based on historical access data sent by the LAF, and the second cache information includes a base station identifier, identifiers of first N2 pieces of application information that are accessed for a maximum quantity of times in the entire network, and content corresponding to the identifiers of the N2 pieces of application information. The historical access data is content corresponding to first N3 pieces of application information that are accessed for a maximum quantity of times, and N2 and N3 are positive integers.

The determining module is configured to determine the local cache content based on the first cache information, the second cache information, and the capacity of the local cache.

The apparatus in this embodiment may be used to execute the technical solutions of the method embodiment shown in FIG. 3 or FIG. 4. The implementation principles and technical effects are similar, and are not further described herein.

Figure 11:
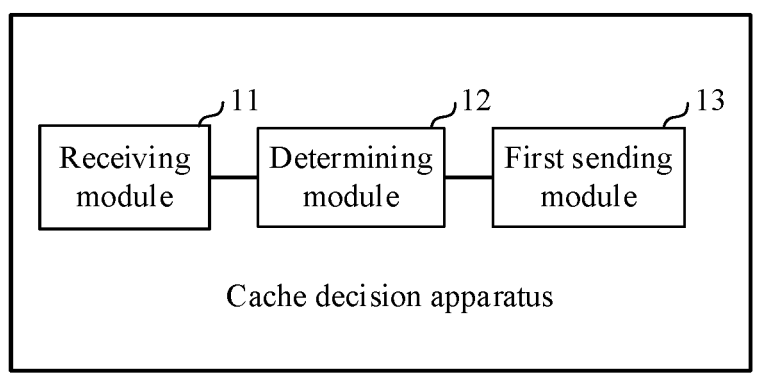
FIG. 11 is a schematic structural diagram of an embodiment of a cache decision apparatus according to this application.

FIG. 11 is a schematic structural diagram of an embodiment of a cache decision apparatus according to this application. As shown in FIG. 11, based on the structure of the apparatus shown in FIG. 10, the apparatus in this embodiment may further include a first sending module 13. The sending module 13 is configured to send offloading rule information that carries an identifier of application information in the local cache content to a session management function network element SMF serving current user equipment, the offloading rule information is used to instruct the SMF to send a second notification message to a user plane function UPF, and the second notification message is used to instruct the UPF to send an identifier of target application information to the SMF; or send offloading rule information that carries an identifier of application information in the local cache content to an SMF, where the offloading rule information is used to instruct the SMF to forward the offloading rule information to a UPF connected to the SMF.

The apparatus in this embodiment may be used to execute the technical solutions of the method embodiment shown in FIG. 3 or FIG. 4. The implementation principles and technical effects are similar, and are not further described herein.

Figure 12:
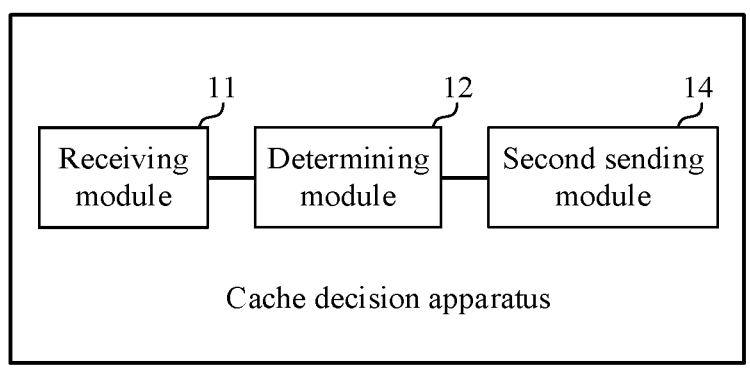
FIG. 12 is a schematic structural diagram of an embodiment of a cache decision apparatus according to this application.

FIG. 12 is a schematic structural diagram of an embodiment of a cache decision apparatus according to this application. As shown in FIG. 12, the apparatus in this embodiment is based on the structure of the apparatus shown in FIG. 10 or FIG. 11, and this embodiment uses the structure of the apparatus shown in FIG. 7 as an example. Further, the apparatus may further include a second sending module 14. The second sending module is configured to send a first notification message to the local cache, where the first notification message includes an identifier of application information in the local cache content, and the first notification message is used to instruct the local cache to update the local cache content based on the identifier of application information in the local cache content.

In the foregoing embodiment, optionally, the first cache information is sent by the LAF at a period of t1, or the first cache information is sent by the LAF when a data volume of the first cache information is equal to a first threshold;

the second cache information is sent by the NWDAF at a period of t2, or the second cache information is sent by the NWDAF when a data volume of the second cache information is equal to a second threshold;

the historical access data is sent by the LAF at a period of t3, or the historical access data is sent by the LAF when a data volume of the historical access data is equal to a third threshold; and $t1<t2$, and $t1<t3$.

In the foregoing embodiment, further, the determining module 12 is specifically configured to:

determine the local cache content based on percentages of the first cache information and the second cache information in the capacity of the local cache.

In the foregoing embodiment, the first cache information further includes a quantity of times that the identifiers of the N1 pieces of application information are accessed, and the second cache information further includes a quantity of times that the identifiers of the N2 pieces of application information are accessed.

The apparatus in this embodiment may be used to execute the technical solutions of the method embodiment shown in FIG. 3 or FIG. 4. The implementation principles and technical effects are similar, and are not further described herein.

Figure 13:
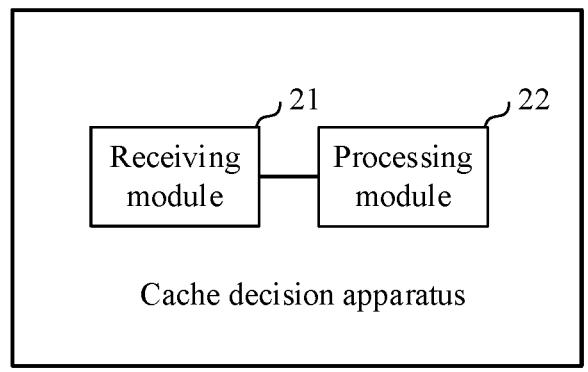
FIG. 13 is a schematic structural diagram of an embodiment of a cache decision apparatus according to this application.

FIG. 13 is a schematic structural diagram of an embodiment of a cache decision apparatus according to this application. As shown in FIG. 13, the apparatus in this embodiment may include a receiving module 21 and a processing module 22. The receiving module 21 is configured to receive an identifier of target application information. The processing module 22 is configured to instruct a UPF to route a data packet that carries the identifier of the target application information to a local cache when an identifier of application information carried in offloading rule information includes the identifier of the target application information.

Optionally, the receiving module 21 is further configured to receive offloading rule information sent by a cache decision function PCF.

In this embodiment, optionally, the identifier of the target application information is sent by the UPF to an SMF, or the identifier of the target application information is carried in control signaling sent by user equipment to an SMF.

The apparatus in this embodiment may be used to execute the technical solutions of the method embodiment shown in FIG. 5. The implementation principles and technical effects are similar, and are not further described herein.

Figure 14:
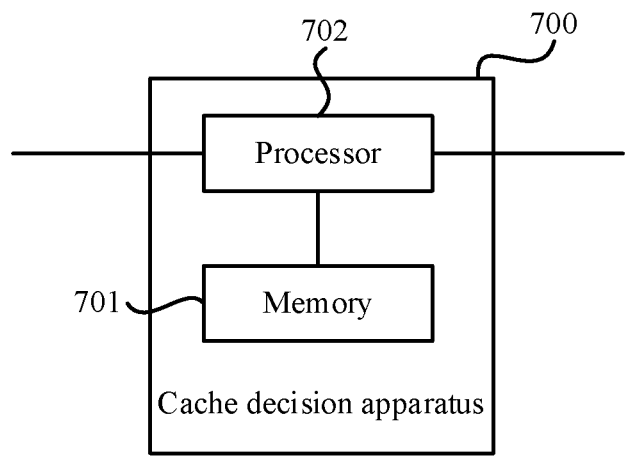
FIG. 14 is a schematic diagram of another cache decision apparatus according to this application.

FIG. 14 is a schematic diagram of another cache decision apparatus according to this application. The cache decision apparatus 700 includes:

a memory 701, configured to store a program instruction, where the memory may be a flash (flash memory); and a processor 702, configured to invoke and execute the program instruction in the memory, to implement the steps in the cache decision method shown in any one of FIG. 3 to FIG. 5. For details, refer to the related descriptions in the foregoing method embodiments.

Figure 15:
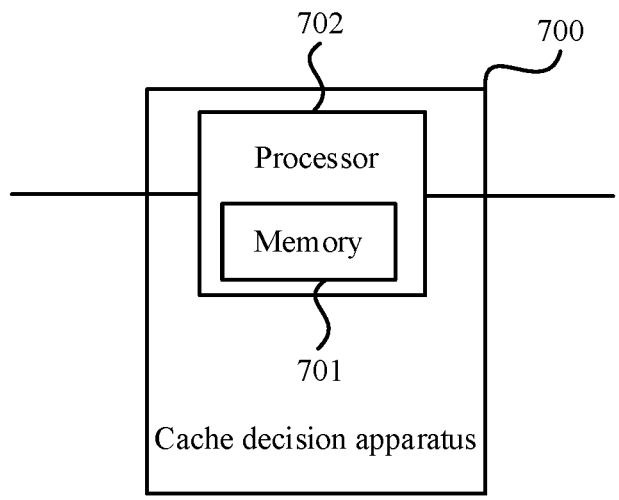
FIG. 15 is a schematic diagram of another cache decision apparatus according to this application.

Optionally, the memory 701 may be independent, or may be arranged as shown in FIG. 15. FIG. 15 is a schematic diagram of another cache decision apparatus according to this application, where the memory 701 is integrated with the processor 702.

The cache decision apparatus may be configured to perform the steps and/or procedures corresponding to the CDF or the SMF in the foregoing method embodiments.

This application further provides a readable storage medium. The readable storage medium stores an execution instruction. When at least one processor of a cache decision apparatus executes the execution instruction, the cache decision apparatus performs the cache decision method provided in the foregoing implementations.

This application further provides a program product. The program product includes an execution instruction, and the execution instruction is stored in a readable storage medium. At least one processor of a cache decision apparatus may read the execution instruction from the readable storage medium, and the at least one processor executes the execution instruction, so that the cache decision apparatus is enabled to implement the cache decision method provided in the foregoing implementations.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A cache decision method, comprising:

receiving, by a policy control function (PCF), first cache information sent by at least one local analytic function (LAF), wherein the first cache information comprises a base station identifier, identifiers of N1 pieces of application information that are accessed for a maximum quantity of times, and content corresponding to the identifiers of the N1 pieces of application information, and wherein N1 is a positive integer;

sending, by a network data analytics network element (NWDAF), second cache information, wherein the second cache information is determined by the NWDAF by performing network-wide data analysis based on historical access data sent by the LAF, the second cache information comprises a base station identifier, identifiers of N2 pieces of application information that are accessed for a maximum quantity of times in an entire network, and content corresponding to the identifiers of the N2 pieces of application information, the historical access data is content corresponding to N3 pieces of application information that are accessed for a maximum quantity of times, and N2 and N3 are positive integers;

receiving, by the PCF, the second cache information;

determining, by the PCF, local cache content based on the first cache information, the second cache information, and a capacity of a local cache; and sending, by the PCF to a session management function network element (SMF), offloading rule information that carries an identifier of the application information in the local cache content.

2. The method according to claim 1, wherein the sending, by the PCF to the SMF, the offloading rule information comprises:

sending, by the PCF, the offloading rule information that carries the identifier of the application information in the local cache content to the SMF serving current user equipment;

wherein the offloading rule information is used to instruct the SMF to send a second notification message to a user plane function (UPF), and the second notification message is used to instruct the UPF to send an identifier of target application information to the SMF, or wherein the offloading rule information is used to instruct the SMF to forward the offloading rule information to a UPF connected to the SMF.

3. The method according to claim 1, wherein the method further comprises:

sending, by the PCF, a first notification message to the local cache, wherein the first notification message comprises the identifier of the application information in the local cache content, and the first notification message is used to instruct the local cache to update the local cache content based on the identifier of application information in the local cache content.

4. The method according to claim 1, wherein the first cache information is sent by the LAF at a period of t1, the second cache information is sent by the NWDAF at a period of t2, and the historical access data is sent by the LAF at a period of t3, wherein t1<t2 and t1<t3; or the first cache information is sent by the LAF when a data volume of the first cache information is equal to a first threshold, the second cache information is sent by the NWDAF when a data volume of the second cache information is equal to a second threshold, and the historical access data is sent by the LAF when a data volume of the historical access data is equal to a third threshold.

5. The method according to claim 1, wherein the determining, by the PCF, the local cache content based on the first cache information, the second cache information, and the capacity of the local cache comprises:

determining, by the PCF, the local cache content based on percentages of the first cache information and the second cache information in the capacity of the local cache.

6. The method according to claim 1, wherein the first cache information further comprises a quantity of times that the identifiers of the N1 pieces of application information are accessed, and the second cache information further comprises a quantity of times that the identifiers of the N2 pieces of application information are accessed.

7. A communications system comprising a memory and a processor and configured for cache decision, comprising:

at least one local analytic function (LAF), configured to send first cache information to a policy control function (PCF), wherein the first cache information comprises a base station identifier, identifiers of N1 pieces of application information that are accessed for a maximum quantity of times, and content corresponding to the identifiers of the N1 pieces of application information, and wherein N1 is a positive integer;

a network data analytics network element (NWDAF), configured to send second cache information, wherein the second cache information is determined by the NWDAF by performing network-wide data analysis based on historical access data sent by the LAF, the second cache information comprises a base station identifier, identifiers of N2 pieces of application information that are accessed for a maximum quantity of times in an entire network, and content corresponding to the identifiers of the N2 pieces of application information, the historical access data is content corresponding to N3 pieces of application information that are accessed for a maximum quantity of times, and N2 and N3 are positive integers; and the PCF, configured to:

receive the first cache information and the second cache information;

determine local cache content based on the first cache information, the second cache information, and a capacity of a local cache; and send, to a session management function network element (SMF), offloading rule information that carries an identifier of the application information in the local cache content.

8. The system according to claim 7, wherein the PCF being further configured to send to the SMF, the offloading rule information comprises sending the offloading rule information that carries the identifier of the application information in the local cache content to the SMF serving current user equipment;

wherein the offloading rule information is used to instruct the SMF to send a second notification message to a user plane function (UPF), and the second notification message is used to instruct the UPF to send an identifier of target application information to the SMF, or wherein the offloading rule information is used to instruct the SMF to forward the offloading rule information to a UPF connected to the SMF.

9. The system according to claim 7, wherein the PCF further configured to send a first notification message to the local cache, wherein the first notification message comprises the identifier of the application information in the local cache content, and the first notification message is used to instruct the local cache to update the local cache content based on the identifier of application information in the local cache content.

10. The system according to claim 7, wherein the first cache information is sent by the LAF at a period of t1, the second cache information is sent by the NWDAF at a period of t2, and the historical access data is sent by the LAF at a period of t3, wherein t1<t2 and t1<t3; or the first cache information is sent by the LAF when a data volume of the first cache information is equal to a first threshold, the second cache information is sent by the NWDAF when a data volume of the second cache information is equal to a second threshold, and the historical access data is sent by the LAF when a data volume of the historical access data is equal to a third threshold.

11. The system according to claim 7, wherein the PCF is configured to:

determine the local cache content based on percentages of the first cache information and the second cache information in the capacity of the local cache.

12. The system according to claim 7, wherein the first cache information further comprises a quantity of times that the identifiers of the N1 pieces of application information are accessed, and the second cache information further comprises a quantity of times that the identifiers of the N2 pieces of application information are accessed.

13. A cache decision method, comprising:

receiving, by a policy control function (PCF), first cache information sent by at least one local analytic function (LAF), wherein the first cache information comprises a base station identifier, identifiers of N1 pieces of application information that are accessed for a maximum quantity of times, and content corresponding to the identifiers of the N1 pieces of application information, and wherein N1 is a positive integer;

receiving, by the PCF, a second cache information from a network data analytics network element (NWDAF), wherein the second cache information is determined by the NWDAF by performing network-wide data analysis based on historical access data sent by the LAF, the second cache information comprises a base station identifier, identifiers of N2 pieces of application information that are accessed for a maximum quantity of times in an entire network, and content corresponding to the identifiers of the N2 pieces of application information, the historical access data is content corresponding to N3 pieces of application information that are accessed for a maximum quantity of times, and N2 and N3 are positive integers;

determining, by the PCF, local cache content based on the first cache information, the second cache information, and a capacity of a local cache; and sending, by the PCF to a session management function network element (SMF), offloading rule information that carries an identifier of the application information in the local cache content.

14. The method according to claim 13, wherein the sending, by the PCF to the SMF, the offloading rule information comprises:
- sending, by the PCF, the offloading rule information that carries the identifier of the application information in the local cache content to the SMF serving current user equipment;
- wherein the offloading rule information is used to instruct the SMF to send a second notification message to a user plane function (UPF), and the second notification message is used to instruct the UPF to send an identifier of target application information to the SMF, or
- wherein the offloading rule information is used to instruct the SMF to forward the offloading rule information to a UPF connected to the SMF.

15. The method according to claim 13, wherein the method further comprises:
- sending, by the PCF, a first notification message to the local cache, wherein the first notification message comprises the identifier of the application information in the local cache content, and the first notification message is used to instruct the local cache to update the local cache content based on the identifier of the application information in the local cache content.

16. A cache decision apparatus comprising a memory and a processor, wherein the memory stores computing instructions that, when executed, cause the processor to perform:
- receiving, by a policy control function (PCF), first cache information sent by at least one local analytic function (LAF), wherein the first cache information comprises a base station identifier, identifiers of N1 pieces of application information that are accessed for a maximum quantity of times, and content corresponding to the identifiers of the N1 pieces of application information, and wherein N1 is a positive integer;
- receiving, by the PCF, a second cache information from a network data analytics network element (NWDAF), wherein the second cache information is determined by the NWDAF by performing network-wide data analysis based on historical access data sent by the LAF, the second cache information comprises a base station identifier, identifiers of N2 pieces of application information that are accessed for a maximum quantity of times in an entire network, and content corresponding to the identifiers of the N2 pieces of application information, the historical access data is content corresponding to N3 pieces of application information that are accessed for a maximum quantity of times, and N2 and N3 are positive integers;
- determining, by the PCF, local cache content based on the first cache information, the second cache information, and a capacity of a local cache; and
- sending, by the PCF to a session management function network element (SMF), offloading rule information that carries an identifier of the application information in the local cache content.

17. The apparatus according to claim 16, wherein the sending, by the PCF to the SMF, the offloading rule information comprises:
- sending, by the PCF, the offloading rule information that carries the identifier of the application information in the local cache content to the SMF serving current user equipment;
- wherein the offloading rule information is used to instruct the SMF to send a second notification message to a user plane function (UPF), and the second notification message is used to instruct the UPF to send an identifier of target application information to the SMF, or
- wherein the offloading rule information is used to instruct the SMF to forward the offloading rule information to a UPF connected to the SMF.

18. The apparatus according to claim 13, wherein the computing instructions cause the one or more processors to further perform:
- sending, by the PCF, a first notification message to the local cache, wherein the first notification message comprises the identifier of the application information in the local cache content, and the first notification message is used to instruct the local cache to update the local cache content based on the identifier of the application information in the local cache content.

* * * * *

UNITED STATES PATENT AND TRADEMARK OFFICE
CERTIFICATE OF CORRECTION

PATENT NO. : 11,683,392 B2  
APPLICATION NO. : 16/910576  
DATED : June 20, 2023  
INVENTOR(S) : Huan Yan et al.

Page 1 of 1

It is certified that error appears in the above-identified patent and that said Letters Patent is hereby corrected as shown below:

In the Claims

In Column 22, Line 31, in Claim 18, delete "claim 13," and insert -- claim 16, --.

In Column 22, Line 32, in Claim 18, delete "one or more processors" and insert -- processor --.

Signed and Sealed this  
Fifteenth Day of August, 2023

Katherine Kelly Vidal  
*Director of the United States Patent and Trademark Office*